(12) United States Patent
Farnsworth et al.

(10) Patent No.: US 8,498,638 B2
(45) Date of Patent: Jul. 30, 2013

(54) METHOD AND APPARATUS FOR SCANNING FOR CELLS IN A WIRELESS COMMUNICATIONS NETWORK

(75) Inventors: Andrew Farnsworth, Marlbrook (GB); Nicola Nicki Wilson, Rusland (GB); Chin Ying Nelson Cheung, Hong Kong (HK)

(73) Assignee: Research In Motion Limited, Waterloo (CA)

( * ) Notice: Subject to any disclaimer, the term of this patent is extended or adjusted under 35 U.S.C. 154(b) by 1274 days.

(21) Appl. No.: 11/962,380

(22) Filed: Dec. 21, 2007

(65) Prior Publication Data
US 2009/0163204 A1    Jun. 25, 2009

(51) Int. Cl.
*H04W 4/00* (2009.01)
(52) U.S. Cl.
USPC ............ 455/434; 455/67.11; 455/455
(58) Field of Classification Search
USPC ...................... 455/67.11, 434–444
See application file for complete search history.

(56) References Cited

U.S. PATENT DOCUMENTS

| | | | |
|---|---|---|---|
| 6,097,953 A * | 8/2000 | Bonta et al. | 455/436 |
| 7,363,379 B2 * | 4/2008 | Tejaswini et al. | 455/435.2 |
| 2005/0047492 A1 * | 3/2005 | Amerga et al. | 375/150 |
| 2006/0030271 A1 * | 2/2006 | Ishihara | 455/67.11 |

FOREIGN PATENT DOCUMENTS

| | | |
|---|---|---|
| GB | 2 407 003 A | 4/2005 |
| GB | 2 414 905 A | 12/2005 |
| WO | 2004/036940 A1 | 4/2004 |
| WO | 2007/085306 A1 | 8/2007 |

OTHER PUBLICATIONS

ETSI TS 125 304 v7.3.0 (Oct. 2007), Technical Specification, "Universal Mobile Telecommunications System (UMTS); User Equipment (UE) procedures in idle mode and procedures for cell reselection in connected mode," 3GPP TS 25.304 version 7.3.0 Release 7).

* cited by examiner

*Primary Examiner* — Kashif Siddiqui
(74) *Attorney, Agent, or Firm* — Novak Druce Connolly Bove + Quigg LLP

(57) ABSTRACT

A method of creating a candidate list of available cells for access by a wireless communications device, the method comprising, for each of a plurality of supported frequencies: measuring a received signal strength, and suppressing cell detection on a frequency if: a stored result of a determination of whether a cell was previously detected on the frequency is negative; and the measured received signal strength for the frequency is below a threshold criterion.

23 Claims, 9 Drawing Sheets

Fig. 8A

| Band (810) | UARFCN (820) | Stored Cell Detection (830) | Stored RSSI (840) |
|---|---|---|---|
| I | 10567 | Y | -51 |
| I | 10639 | N | -60 |
| I | 10709 | N | -57 |
| I | 10831 | Y | -49 |
| I | 10903 | N | -49 |

Fig. 8B

| Band (810) | UARFCN (820) | Stored Cell Detection (830) | Stored RSSI (840) | Measured RSSI (850) | Attempt to Detect Cell (860) | Cell Detected? (870) |
|---|---|---|---|---|---|---|
| I | 10567 | Y | -51 | -52 | Y | Y |
| I | 10639 | N | -60 | -54 | Y | N |
| I | 10709 | N | -57 | -56 | N | N |
| I | 10831 | Y | -49 | -49 | Y | Y |
| I | 10903 | N | -49 | -50 | N | N |

Fig. 8C

| Band (810) | UARFCN (820) | Stored Cell Detection (830) | Stored RSSI (840) |
|---|---|---|---|
| I | 10567 | Y | -52 |
| I | 10639 | N | -54 |
| I | 10709 | N | -57 |
| I | 10831 | Y | -49 |
| I | 10903 | N | -50 |

METHOD AND APPARATUS FOR SCANNING FOR CELLS IN A WIRELESS COMMUNICATIONS NETWORK

TECHNICAL FIELD

This application relates to telecommunication systems in general, having for example application in UMTS (Universal Mobile Telecommunications System). In particular, this application relates to a method and apparatus for creating a candidate list of available cells in a wireless communications network.

DESCRIPTION OF THE RELATED ART

In a typical cellular radio system, mobile user equipment (UE) communicates via a radio access network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice signals and/or data signals with the radio access network.

In the following, reference will be made to UMTS and to particular standards. However it should be understood that the invention is not intended to be limited to any particular mobile telecommunications system or standard.

The radio access network covers a geographical area divided into a plurality of cell areas. Each cell area is served by at least one base station, which in UMTS may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), which complies with the 3GPP specifications for the UMTS protocol. The 3GPP 25.304 technical specification v7.1.0, incorporated herein by reference, addresses the subject of UE procedures in idle mode and procedures for cell reselection in connected mode. Section 5.1.2.2 of the 25.304 specification defines the required support for PLMN Selection in the UMTS Terrestrial Radio Access (UTRA) case. This requires the UE to scan all RF channels in the UTRA bands it supports to find available PLMNs.

A scan to find available PLMNs must be performed regularly such that if the UE is moving, new PLMNs may be detected for the UE to communicate with. However, attempting to detect a PLMN on a frequency can take about 250 ms, and in some cases it may take about 500 ms. A UE will support at least one UMTS band, for example band I. In band I there are 277 frequencies, so in some cases it will take a UE over 2 minutes to search for PLMNs on band I. Some UEs support more than one band, giving rise to yet longer timescales.

Thus, searching for available PLMNs can take a significant amount of time. Furthermore, the PLMN search consumes processing power and battery resources.

There are thus proposed strategies for a method and apparatus for creating a candidate list of available cells in a wireless communications network. A number of such strategies are detailed below.

Other aspects and features of the proposed strategy will become apparent to those ordinarily skilled in the art upon review of the following description of specific embodiments of a method and apparatus for creating a candidate list of available cells in a wireless communications network.

SUMMARY

Typically, a wireless apparatus searches for a cell on every frequency of a band. Embodiments of the method described herein allow a wireless apparatus to more quickly scan for cells of a wireless cellular network. A wireless apparatus uses signal strength measurements, which can be performed very quickly, to determine a subset of frequencies for which it searches for a cell. Searching for a cell on a particular frequency involves a somewhat lengthy process (around 250 ms). Consequently, a reduction in the number of frequencies on which a wireless apparatus must perform a cell search reduces the overall time required for cell searching.

The invention is as set out in the claims.

BRIEF DESCRIPTION OF THE DRAWINGS

Embodiments will now be described, by way of example only, with reference to the attached drawings, in which:

FIGS. 8A, 8B and 8C show a data structure suitable for implementing the method for scanning for cells in a wireless communications network.

Where appropriate, like reference numerals are used in different figures to denote like elements.

DETAILED DESCRIPTION OF THE DRAWINGS

Figure 1:
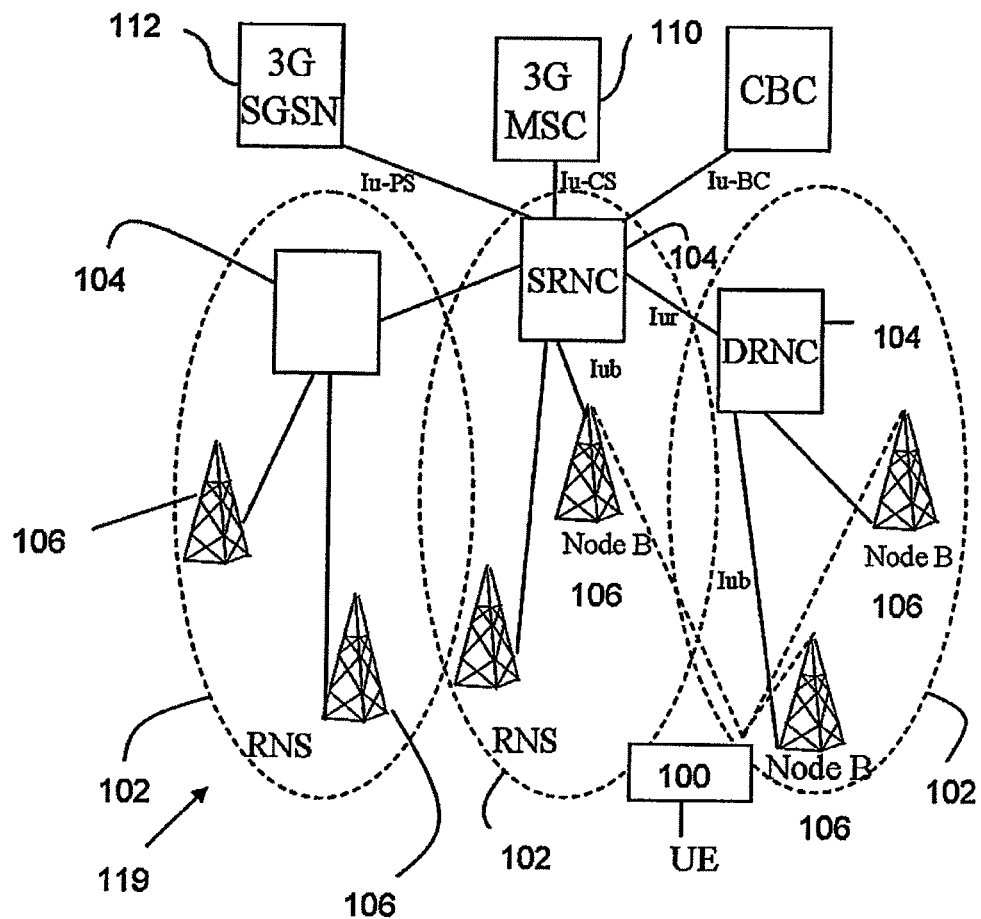
FIG. 1 is a schematic diagram showing an overview of a network and a UE.

The method disclosed herein may be implemented in a user equipment device of a wireless communications network. Referring to the drawings, FIG. 1 is a schematic diagram showing an overview of a network and a user equipment device. Clearly in practice there may be many user equipment devices operating with the network but for the sake of simplicity FIG. 1 only shows a single user equipment device 100. For the purposes of illustration, FIG. 1 also shows a radio access network 119 (UTRAN) used in a UMTS system having a few components. It will be clear to a person skilled in the art that in practice a network will include far more components than those shown.

The network 119 as shown in FIG. 1 comprises three Radio Network Subsystems (RNS) 102. Each RNS has a Radio Network Controller (RNC) 104. Each RNS 102 has one or more Node B 102 which are similar in function to a Base Transmitter Station of a GSM radio access network. User Equipment UE 100 may be mobile within the radio access network. Radio connections (indicated by the straight dotted lines in FIG. 1) are established between the UE and one or more of the Node Bs in the UTRAN.

Figure 2:
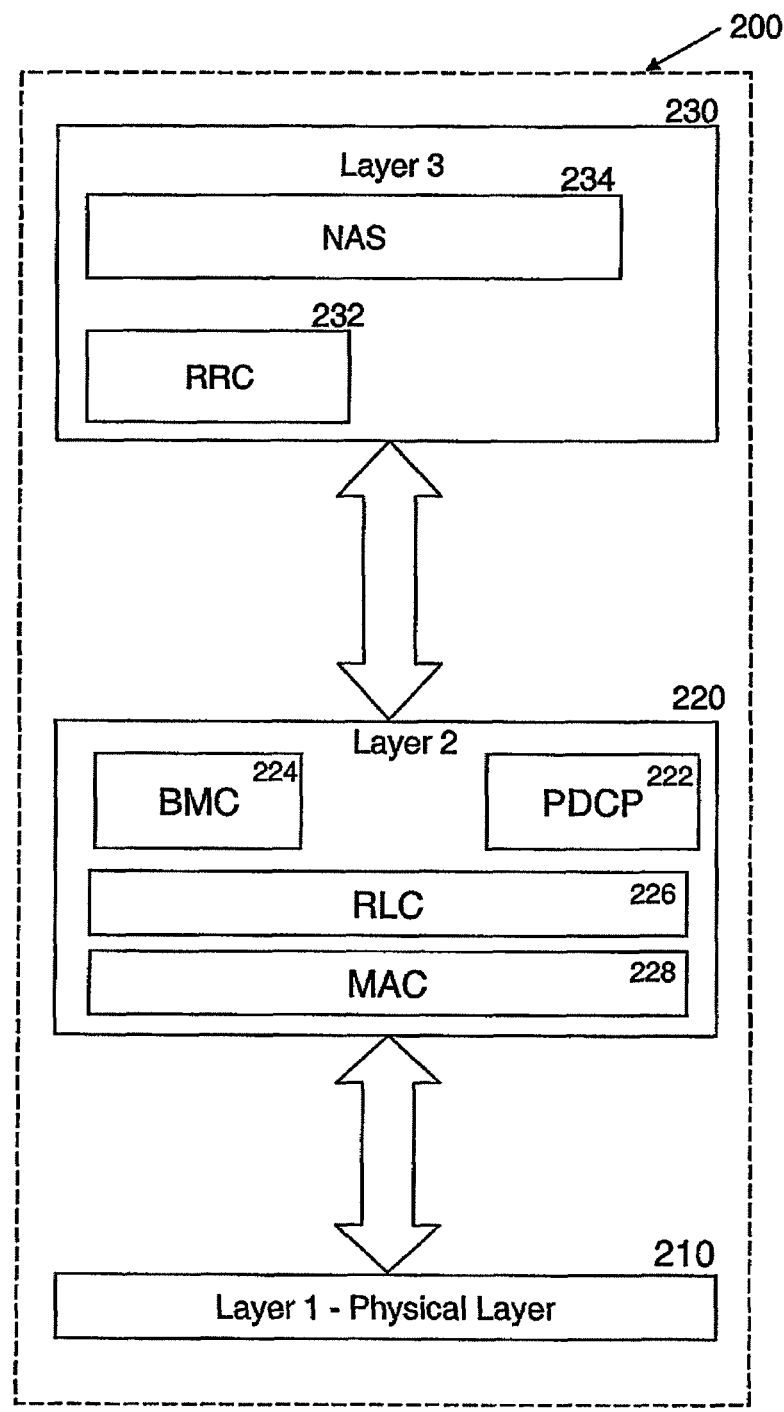
FIG. 2 is a block diagram illustrating a UE protocol stack.

Within each UE of a UMTS network, a protocol stack controls the operation of the device. FIG. 2 is a block diagram illustrating such a UE protocol stack. A Radio Resource Controller (RRC) block 232 is a sub layer of Layer 3 230 of a UMTS protocol stack 200. The RRC 232 exists in the control plane only and provides an information transfer service to the non-access stratum NAS 234. The RRC 232 is responsible for controlling the configuration of radio interface Layer 1 210 and Layer 2 220. When the UTRAN needs to change the UE configuration it issues a message to the UE containing a command to invoke a specific RRC procedure. A MAC 228 is a layer 2 protocol that handles communications between the RLC 226 and the Physical Layer 210.

The 3GPP UMTS specifications require that a UMTS access stratum can scan a subset of supported UMTS bands and list all the PLMNs that it can detect. This is to be done periodically such that if the UE is moving, new PLMNs may be detected.

The requirements for a UE to scan for PLMNs are described in 3GPP TS 25.304, section 5.1.2.2. This requires the UE to scan all RF channels in the UTRA bands it supports to find available PLMNs. On each carrier, the UE searches for the strongest cell and reads its system information in order to find out which PLMN the cell belongs to. If the UE can read a PLMN identity in the strongest cell, this identity is reported to the NAS.

The search for PLMNs on the rest of the carriers may be stopped on request of the NAS. The UE may optimize this search by using stored information for carriers and optionally also information on cell parameters, e.g. scrambling codes, from previously received measurement control information elements.

Once the UE has selected a PLMN, the cell selection procedure is performed in order to select a suitable cell of that PLMN to camp on. The cell selection procedure is described at 3GPP TS 25.304, section 5.2.

Figure 3:
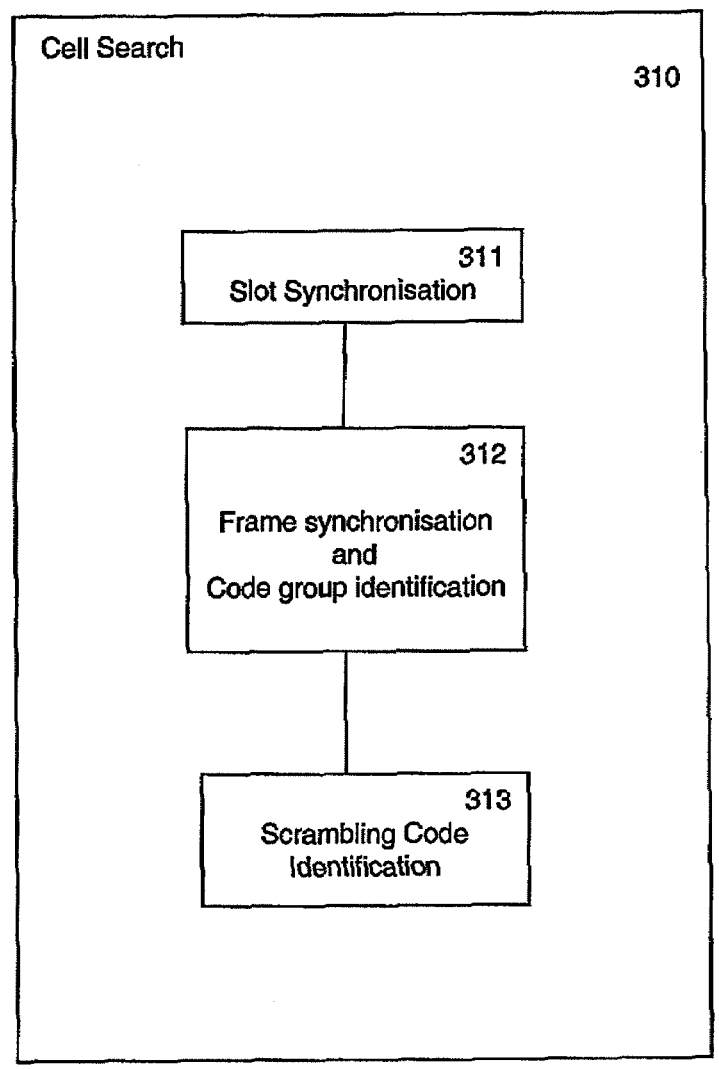
FIG. 3 is a flow diagram of a cell search performed by the UE.

FIG. 3 shows a cell search 310 which is performed by the UE. This illustrates the cell search process for a single frequency and indicates why the process is relatively time consuming. In this process, the UE searches for a cell and determines the downlink scrambling code and frame synchronization of that cell. The cell search 310 is typically carried out in three steps, as follows.

Step 311 is Slot synchronization. During this first step of the cell search procedure the UE uses the Synchronization Channel's primary synchronization code to acquire slot synchronization to a cell. This is typically done with a single matched filter (or any similar device) matched to the primary synchronization code which is common to all cells. The slot timing of the cell can be obtained by detecting peaks in the matched filter output.

Step 312 is Frame synchronization and code-group identification. During this second step of the cell search procedure, the UE uses the Synchronization Channel's secondary synchronization code to find frame synchronization and identify the code group of the cell found in the first step. This is done by correlating the received signal with all possible secondary synchronization code sequences, and identifying the maximum correlation value. Since the cyclic shifts of the sequences are unique, the code group as well as the frame synchronization are determined.

Step 313 is Scrambling-code identification. During this third step of the cell search procedure, the UE determines the exact primary scrambling code used by the found cell. The primary scrambling code is typically identified through symbol-by-symbol correlation over the CPICH with all codes within the code group identified in the second step. After the primary scrambling code has been identified, the Primary CCPCH can be detected. Then the system and cell specific BCH information can be read.

In order to search for all PLMNs, the UE must perform the above cell search on each frequency it supports. This can take between about 250 ms to about 500 ms per frequency. In band 1 alone there are 277 frequencies, so in some cases it could take over 2 minutes to find all the available cells. This will be multiplied for each band supported by the UE. Note that most of the frequencies in the band will not have a cell present.

According to a method disclosed herein, the UE is able to determine which frequencies are more likely to have a cell by measuring the Received Signal Strength Indication (RSSI) of the frequency prior to trying to detect a cell. The RSSI measurement is usually quite a fast operation, for example to find the RSSI for each of the 277 frequencies in band I takes less than a second. It will be apparent that the cells may be UMTS cells and that each cell may correspond to a PLMN.

The UE may be any wireless communications device. The RSSI may be any signal strength measurement. The method described herein refers to supported frequencies, the method may equally apply to any plurality of supported carrier signals.

The RSSI is a measure of the strength of the incoming signal in the receiver of the UE. The signal strength indicator on a cell phone display is an example of the use of this measure. RSSI is often measured in the intermediate frequency stage of a receiver before the intermediate frequency amplifier. In UMTS the RSSI gives the wide-band received power within a particular UTRAN downlink channel bandwidth.

UMTS Terrestrial Radio Access (UTRA) carrier RSSI is defined in 3GPP TS 25.215, incorporated herein by reference, at section 5.1.3. The UTRA carrier RSSI is the received wide band power, including thermal noise and noise generated in the receiver, within the bandwidth defined by the receiver pulse shaping filter. The reference point for the measurement shall be the antenna connector of the UE. If receiver diversity is in use by the UE, the reported value shall be equivalent to the linear average of the power values of all diversity branches.

A method disclosed herein requires storing the RSSI scan measurements for each supported frequency when performing an initial PLMN search, and whether a cell was successfully detected on that frequency or not. Then for any subsequent PLMN search, the RSSI measurements for the new scan will be compared to the RSSI measurement from the previous scan for each frequency. If there was no cell previously detected on that frequency, and its RSSI has not improved by a predetermined amount, then we conclude that there is unlikely to be a cell there now and do not try to detect a cell on that frequency as the signal strength falls below a corresponding threshold criterion.

The predetermined amount may be for example, 3 dBm. This approximately equates to a factor of 2 increase in signal power. Alternatively, there may be no requirement of a predetermined amount such that the test is whether the RSSI has improved or not.

The predetermined amount may be 3 dBm. Alternatively, the predetermined amount may be 2 dBm. Alternatively still, the predetermined amount may be 4 dBm. Alternatively still, the predetermined amount may be a factor of 2. Alternatively still, the predetermined amount may be a factor of 2.5. Alternatively still, the predetermined amount may be a factor of 1.5.

The above methods afford a saving of around 500 ms per frequency for which the RSSI measurement has not significantly improved. Since there is a low probability of the skipped frequencies having a cell present, the accuracy of the PLMN search is not significantly affected but there is a significant reduction in the amount of time required for the PLMN search.

Figure 4:
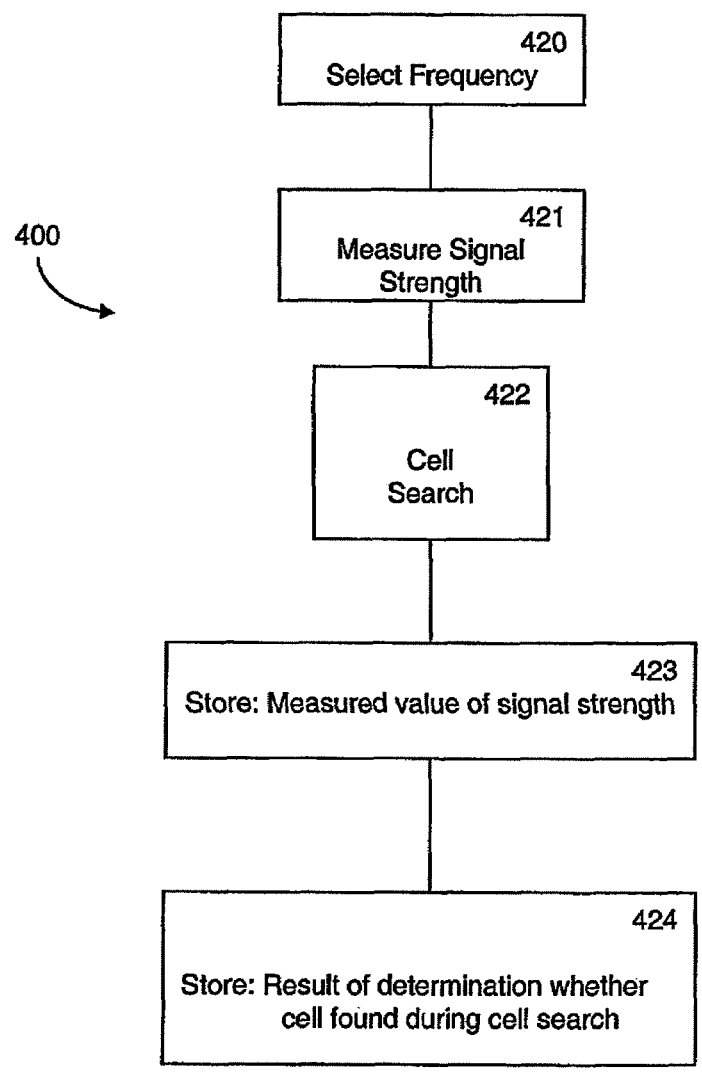
FIG. 4 is a flow diagram of an initialization process.

FIG. 4 shows a flow diagram of an initialization process 400. Initialization process 400 includes a cell search 422 for each selected frequency that the UE could use. At step 420 a frequency is selected. The selected frequency is one of a plurality of frequencies supported by the UE. At step 421, a signal strength measurement is taken for that frequency. At step 422 a cell search is performed, the cell search comprises the steps of cell search 310 as described in relation to FIG. 3. At step 423, the measured value of signal strength is stored. At step 424, the result of the determination of whether a cell was found during the cell search is stored. After step 424 the process moves back to step 420 and the next selected frequency, unless there are no more frequencies to scan at which point the process stops. Alternatively, steps 423 and 424 may be performed in any order, e.g. step 424 followed by step 423.

Figure 5:
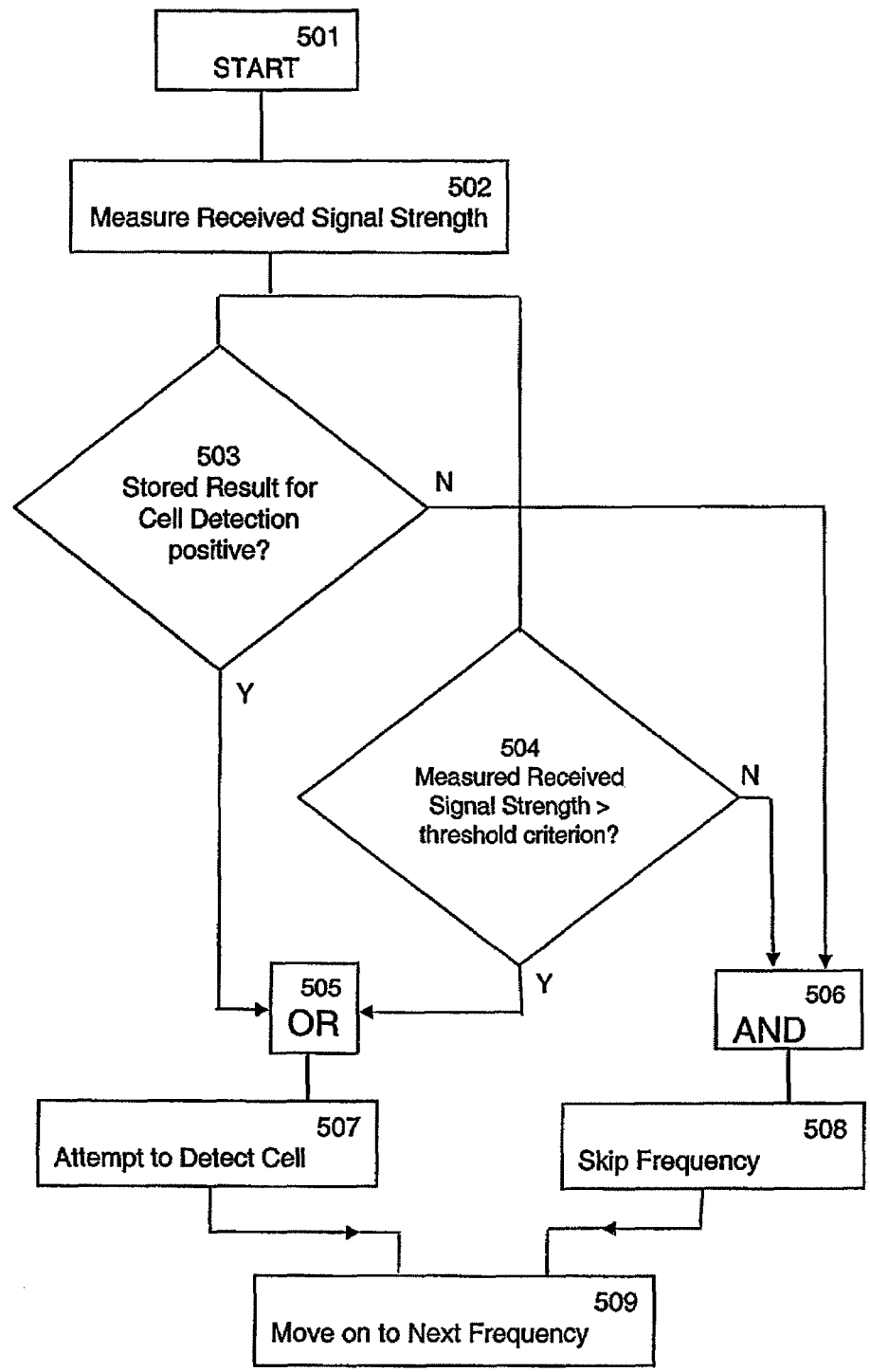
FIG. 5 is a flow diagram of a method for scanning for cells in a wireless communications network.

FIG. 5 shows a flow diagram of a method for scanning for cells in a wireless communications network. The method illustrated in FIG. 5 is performed for each frequency within a band. At step 501 the procedure is initiated. At the step 502 the received signal strength for the present frequency is measured. The method then requires two determinations to be made. The first determination at step 503 is whether a stored result of a determination whether a cell was detected on the frequency is positive. At step 503, if the stored result is positive, then the next step is at logical OR 505. At step 503, if the stored result is negative, then the next step is logical AND 506. The second determination, at step 504, is whether the measured signal strength is greater than a threshold criterion. At step 504, if the determination is positive, then the next step is logical OR 505. At step 504, if the determination is negative, the next step is logical AND 506.

Accordingly, if either the determination at step 503 or the determination at step 504 is positive, then the conditions are satisfied for moving on to step 507, wherein the apparatus attempts to detect a cell on the frequency. Alternatively, if the determinations at step 503 and step 504 are negative, then the conditions are satisfied for moving on to step 508, wherein the apparatus does not attempt to detect a cell at the frequency. Step 509 follows after step 507 or step 508. At step 509, the apparatus moves on to process the next frequency.

The determination at 504 is described above as a determination of whether the measured signal strength is greater than a threshold criterion. The determination at 504 may be whether the measured signal strength is greater than a stored value of a received signal strength. The determination at 504 may be whether the measured signal strength is greater than a stored value of a received signal strength by a predetermined amount.

Figure 6:
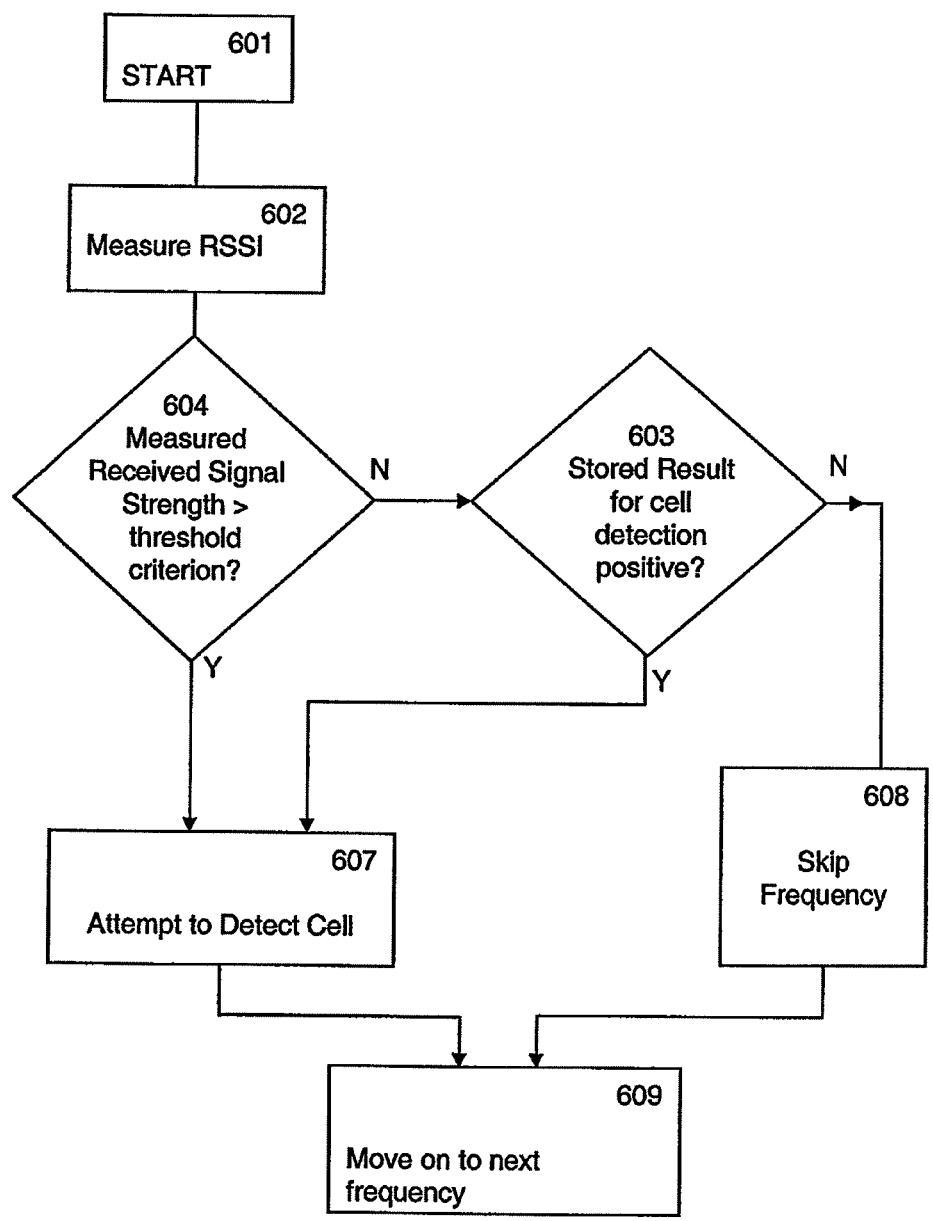
FIG. 6 is a flow diagram of an alternative representation of the method for scanning for cells in a wireless communications network.

FIG. 6 shows a flow diagram of the method for scanning for cells in a wireless communications network, where the steps are reordered. The method illustrated in FIG. 6 is performed for each frequency within a band. At step 601 the procedure is initiated. At the step 602 the received signal strength for the present frequency is measured. The method then requires a determination at step 604. At step 604 it is determined whether the measured signal strength is greater than a threshold criterion. At step 604, if the determination is positive, then the next step is step 607, wherein the apparatus attempts to detect a cell on the frequency. At step 604, if the determination is negative, the next step is a second determination to be made at step 603. At step 603 it is determined whether a stored result of a determination whether a cell was detected on the frequency is positive. At step 603, if the stored result is positive, then the next step is step 607, wherein the apparatus attempts to detect a cell on the frequency. At step 603, if the stored result is negative, then the next step is step 608, wherein the apparatus does not attempt to detect a cell at the frequency. Step 609 follows after step 607 or step 608. At step 609, the apparatus moves on to process the next frequency.

The determination at 604 is described above as a determination of whether the measured signal strength is greater than a threshold criterion. The determination at 604 may be whether the measured signal strength is greater than a stored value of a received signal strength. The determination at 604 may be whether the measured signal strength is greater than a stored value of a received signal strength by a predetermined amount.

Figure 7:
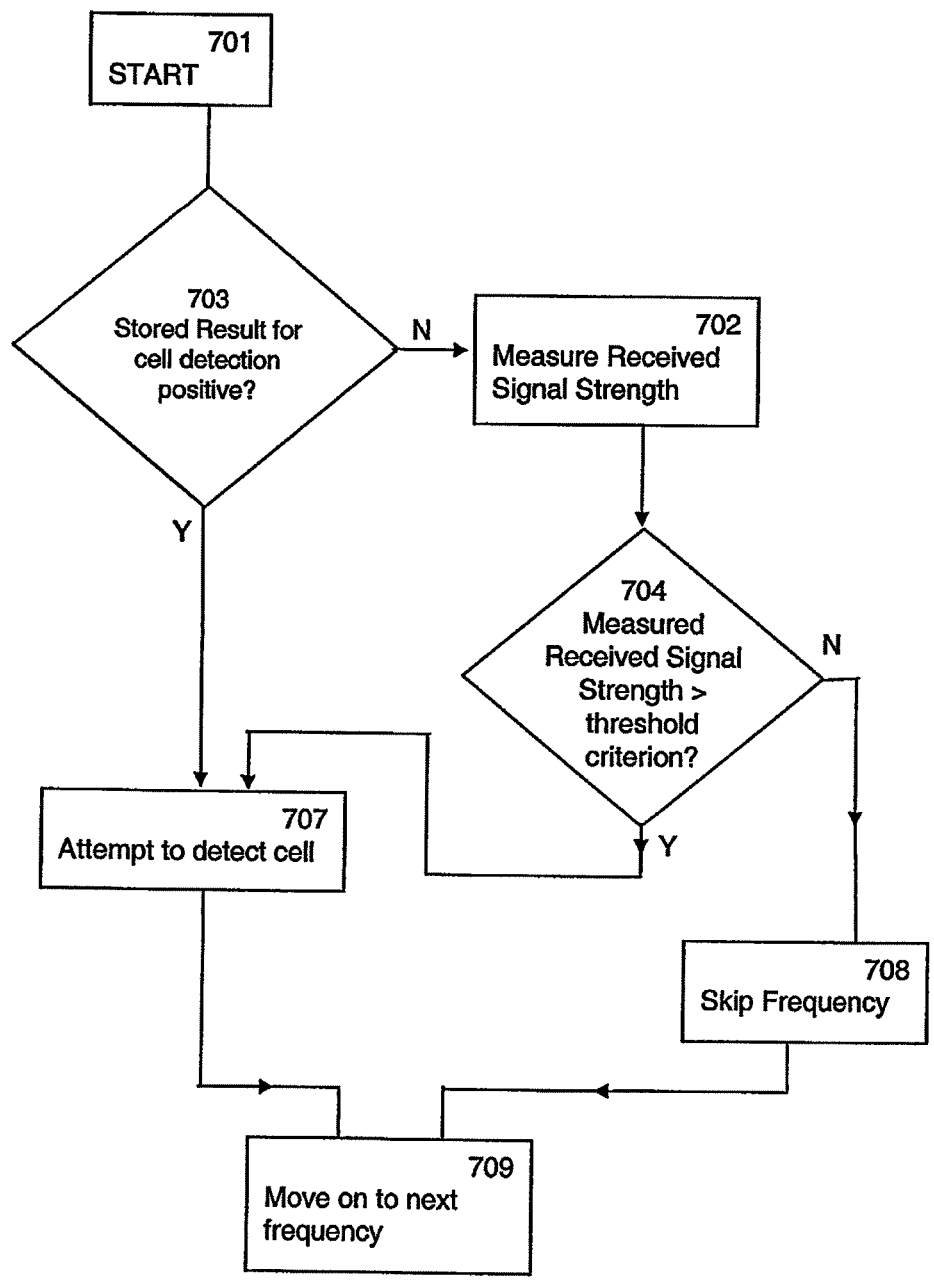
FIG. 7 is a flow diagram of a further alternative representation of a method for scanning for cells in a wireless communications network.

FIG. 7 shows a flow diagram of the method for scanning for cells in a wireless communications network, where the steps are again reordered. The method illustrated in FIG. 7 is performed for each frequency within a band. At step 701 the procedure is initiated. At the next step 703 it is determined whether a stored result of a determination whether a cell was detected on the frequency is positive. At step 703, if the stored result is positive, then the next step is step 707, wherein the apparatus attempts to detect a cell on the frequency. At step 703, if the stored result is negative, then the next step is step 702, where the received signal strength for the present frequency is measured. After step 702 the next step is step 704, where it is determined whether the measured signal strength is greater than a threshold criterion. At step 704, if the determination is positive, then the next step is step 707, wherein the apparatus attempts to detect a cell on the frequency. At step 704, if the determination is negative, the next step is step 708, wherein the apparatus does not attempt to detect a cell at the frequency. Step 709 follows after step 707 or step 708. At step 709, the apparatus moves on to process the next frequency.

The determination at 704 is described above as a determination of whether the measured signal strength is greater than a threshold criterion. The determination at 704 may be whether the measured signal strength is greater than a stored value of a received signal strength. The determination at 704 may be whether the measured signal strength is greater than a stored value of a received signal strength by a predetermined amount.

It should be understood from FIGS. 5, 6 and 7 that where it is stated the method moves on to the next frequency at steps 509, 609 and 709 respectively, in some circumstances this step may be the end of the process. Where this is not the end of the process, then the next frequency may be any frequency. The next frequency may be a frequency in the same band as the frequency just examined. The next frequency may be in a different band to the frequency just examined. As an example, where the frequency is the last processed frequency of the band, then the method may move onto a frequency in the next supported band of the UE, or if there are no further supported bands to be scanned, the scan process is stopped. By way of another example, the frequencies may be processed in order of stored signal strength measurement, regardless of band. In such a case the frequency with the greatest stored signal strength measurement may be processed first. The next frequency is then the next strongest frequency; this next strongest frequency may or may not be in the same band as the first frequency. This applies equally to subsequent frequencies.

FIG. 8 shows a data structure suitable for implementing the method disclosed herein. The data structure of FIG. 8 is shown as a table but it should be understood that any appropriate data structure may be used. FIGS. 8A, 8B and 8C show the data structure at different stages in the scanning process.

In practice, and as used in this example, the UARFCN (UTRA Absolute Radio Frequency Channel Number) is used to identify each frequency. FIG. 8A shows an initial state wherein for each UARFCN 820 in each supported band 810, two values are stored. A first stored value 830 is an indication of whether a cell was detected for the UARFCN during a previous PLMN scan. A second stored value 840 is an indication of the signal strength measured during the previous PLMN scan. The measure of signal strength is RSSI in dBm. Typical values for RSSI are between −120 and 0 dBm.

FIG. 8B shows a working state of the data structure during a cell scan according to the presently disclosed method. A measured RSSI value 850 is recorded for each UARFCN. An indication 860 is the result of a determination of whether a cell should be scanned for at each UARFCN. Whether a cell is searched for at a UARFCN is determined according to one of the above disclosed methods. For example, for UARFCNs 10567 and 10831 the stored result of a determination of whether a cell was detected or not is positive, and so the apparatus determines that it should attempt to detect a cell at these UARFCNs. For the sake of this example, the predetermined value by which the signal strength must improve in order for a frequency to be scanned is 3 dBm. So for UARFCN 10639, where the measured signal strength value is 6 dBm higher than the stored signal strength value, the determination of whether to attempt to detect a cell on this UARFCN is positive, as recorded at 860. By way of comparison, for UARFCN 10709, the measured signal strength value is only 1 dBm higher than the stored signal strength value, and so the determination of whether to attempt to detect a cell on this UARFCN is negative, again this is recorded at 860. 870 is an indication of the results of the determination of whether a cell is detected for the UARFCNs that are scanned.

FIG. 8C shows how the data structure is updated as a result of the scan. The stored value 830 of an indication of whether a cell was detected at the frequency during a previous PLMN scan is replaced by the newly found determination in 870. In contrast, in the example shown, the stored information regarding signal strength measurements in 840 is replaced by the newly measured values in 850, only where either: i) an attempt to detect a cell was made, or ii) the measured RSSI value is lower than the stored RSSI value. So in this example, UARFCNs 10567, 10639 and 10831 have attempts at cell detection performed, and so the values of measured RSSI at 850 for these UARFCNs are stored in column 840 of FIG. 8C. UARFCN 10903 does not have an attempt at cell detection, but the measured RSSI is lower than the stored RSSI and so the value of measured RSSI at 850 for this UARFCN is stored in column 840 of FIG. 8C. UARFCN 10709 also does not have an attempt at cell detection made, but conversely this has a measured RSSI which is higher than the stored RSSI value. So for UARFCN 10709 the stored information regarding signal strength measurement in 840 is not replaced by the newly measured value in 850. The updated values are shown in FIG. 8C.

As such, FIG. 8C represents a next increment over the data structure shown in FIG. 8A.

The above described criteria for determining whether to update the stored RSSI value are not essential to the method disclosed herein. For example, all values of stored signal strength could be overwritten by the measured signal strength values and in such a case a periodic reset could be used to reduce potential errors.

The above criteria for determining whether to overwrite the stored signal strength value are not essential to the method disclosed herein. However, these criteria provide an additional advantage when the measured signal strength for a particular frequency increases over a series of iterations of the method but each increase is below the threshold for cell detection. Without the criteria outlined above, at any one step the frequency will not require an attempt for cell detection. In such a case a very strong signal would not be located. Hence, the stored value of signal strength is only overwritten if an attempt to detect a cell is made. A similar problem may occur where conditions change such that a cell becomes available in conjunction with only a small increase in measured signal strength results. This may occur if a UE moves away from a source of interference and then closer to a UMTS cell. The detected sequence of signal strength measurements for a particular frequency may be as follows: −91, −92, −93, −92, −91, −90. The net change in signal strength over this sequence is only an increase of 1 dBm, but from the low point of −93 to the end at −90, there is a 3 dBm increase, sufficient to overcome the example threshold, and trigger cell detection for this frequency.

An alternative to the above criteria is to apply absolute thresholds. Such as applying the above method for suppressing cell detection except for i) measured signal strength values less than −119 dBm where an attempt at cell detection is only performed where a cell was previously detected at that frequency, and ii) measured signal strength values greater than −60 dBm where an attempt at cell detection at that frequency is always made.

At any particular time the stored RSSI values for all supported UARFCNs may be reinitialized by performing a full PLMN scan for all supported UARFCNs. Such reinitialization may be performed periodically. Such reinitialization may be triggered by a non-periodic event such as the first scan when going out of service. Such a reinitialization may be limited so as to be only performed if a previous reinitialization was not performed within the preceding N seconds.

There is also provided a method of creating a candidate list of available cells for access by a wireless communications device, the method comprising, for each of a plurality of supported frequencies:

measuring a received signal strength, and suppressing cell detection on a frequency if: i) the measured signal strength value is less than a lower limit value, and ii) a cell was not detected in a previous cell detection attempt.

There is also provided a method of creating a candidate list of available cells for access by a wireless communications device, the method comprising, for each of a plurality of supported frequencies:

measuring a received signal strength, suppressing cell detection on a frequency if: i) the measured signal strength value is less than a lower limit value, and ii) a cell was not detected in a previous cell detection attempt, and performing cell detection if the measured signal strength value is greater than an upper limit value.

These methods may reduce the number of possible frequencies for which a cell search is required, this reducing the amount of time required for creating a candidate list of available cells in a wireless communications network.

Figure 9:
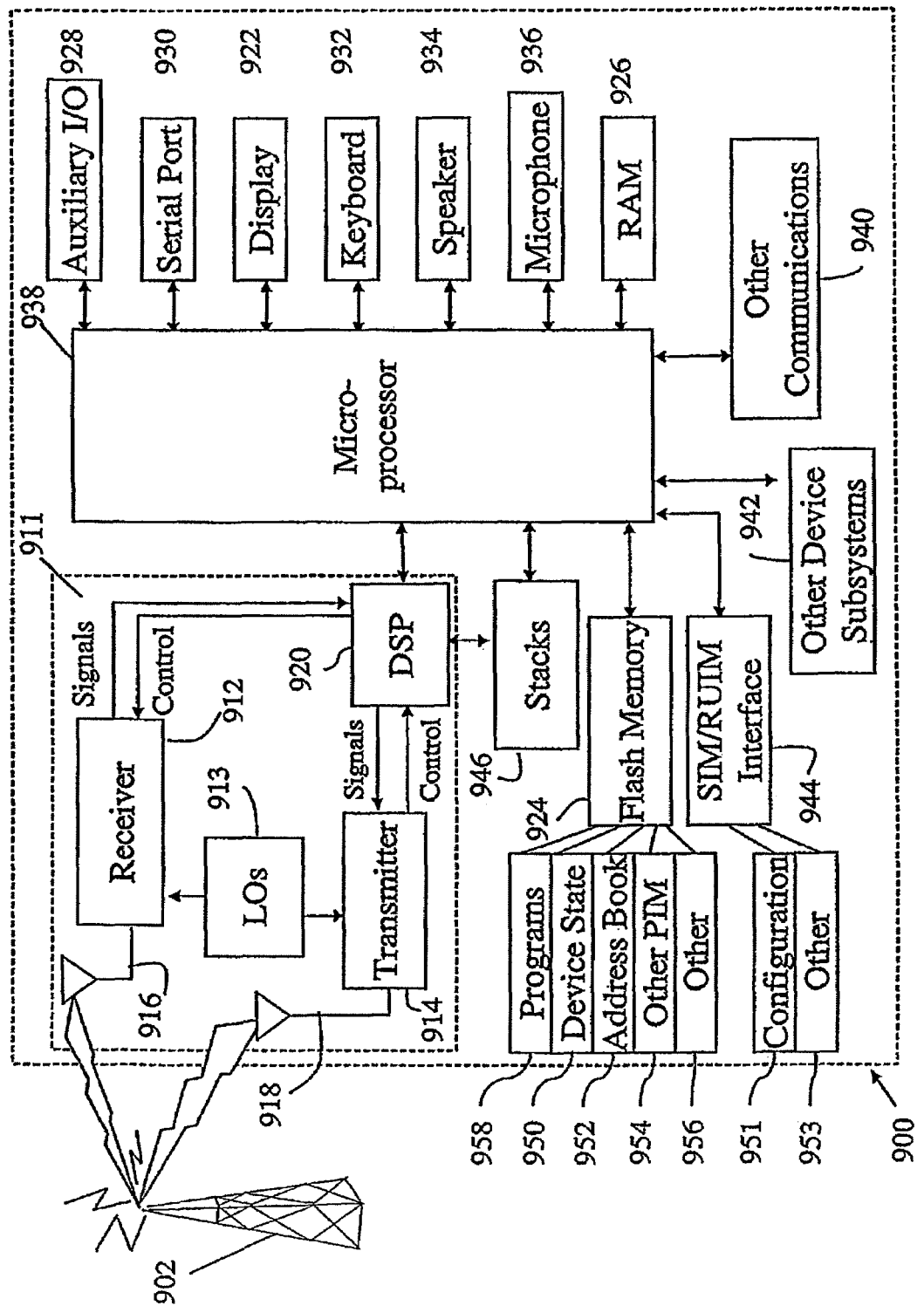
FIG. 9 is a block diagram illustrating a mobile device, which can act as a UE and co-operate with the apparatus and methods of FIGS. 1 to 8.

Turning now to FIG. 9, this is a block diagram illustrating a mobile device, which can act as a UE and co-operate with the apparatus and methods of FIGS. 1 to 8, and which is an exemplary wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, or EDGE network.

Network access requirements will also vary depending upon the type of network 902. For example, in the Mobitex and DataTAC networks, mobile station 900 is registered on the network using a unique identification number associated with each mobile station. In UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 9, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 9, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

Extensions and Alternatives

In the above, a previous candidate list creation exercise may be an initialization exercise. Such an initialization exercise may occur for example upon device startup.

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the steps performed, where the context permits, can be varied and to that extent the ordering of the steps as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method of creating a candidate list of available cells for access by a wireless communications device, the method comprising, for each of a plurality of supported frequencies:
   measuring a received signal strength,
   determining:
      a stored result of a determination whether a cell was previously detected on the frequency; and
      a previously measured signal strength for the frequency; and
   suppressing cell detection on a respective said supported frequency if:
      the stored result is negative; and
      the measured received signal strength for the frequency is below a threshold criterion in relation to the previously measured signal strength.

2. The method of claim 1, wherein the method is performed for every supported band of the wireless communications device.

3. The method of claim 1, wherein the method is performed for every supported frequency of every supported band of the wireless communications device.

4. The method of claim 1, further comprising storing a value indicative of the measured received signal strength for the frequency.

5. The method of claim 1, further comprising storing a value indicative of the measured received signal strength for the frequency if an attempt to detect a cell was made for the frequency.

6. The method of claim 1, further comprising storing a value indicative of the measured received signal strength for the frequency if:
   i) an attempt to detect a cell was made for the frequency, or
   ii) the measured signal strength value is lower than the stored signal strength value.

7. The method of claim 4, wherein storing a value indicative of the measured received signal strength for the frequency comprises overwriting a previously stored value.

8. The method of claim 1, further comprising storing a value indicative of the result of attempted cell detection.

9. The method of claim 1, further comprising retrieving a stored value indicative of a received signal strength measured in any previous candidate list creation exercise.

10. The method of claim 1, further comprising retrieving a stored value indicative of a determination of whether a cell was detected in any previous candidate list creation exercise.

11. The method of claim 1, wherein the threshold criterion is that the measured signal strength is greater than the signal strength measured in a previous candidate list creation exercise plus a predetermined offset value.

12. The method of claim 11, wherein the predetermined offset value is one of:
a positive value,
zero, and
a negative value.

13. The method of claim 11, wherein the predetermined offset value is 3 dBm.

14. The method of claim 1, further comprising suppressing cell detection on the frequency if:
i) the measured signal strength value is less than a lower limit value, and
ii) a cell was not detected in a preceding cell detection attempt.

15. The method of claim 1, further comprising over-tiding the suppression of cell detection if the measured signal strength value is greater than an upper limit value.

16. The method of claim 1, further comprising attempting to detect a cell on a frequency for which cell detection is not suppressed.

17. The method of claim 1, further comprising prioritising candidate cells for connection.

18. The method of claim 1, further comprising selecting a candidate cell for communication.

19. The method of claim 1, wherein the measured value of signal strength for a frequency is measured by taking an RSSI measurement for the frequency.

20. A wireless communications apparatus arranged to create a candidate list of available cells for communication by, for each of a plurality of supported frequencies:
measuring a received signal strength,
determining:
a stored result of a determination whether a cell was previously detected on the frequency; and
a previously measured signal strength for the frequency; and
suppressing cell detection on a respective said supported frequency if:
the stored result is negative; and
the measured received signal strength for the frequency is below a threshold criterion in relation to the previously measured signal strength.

21. A wireless communications apparatus arranged, in use, to implement the method of claim 1.

22. A wireless communications apparatus according to claim 21, wherein the wireless communications apparatus is further arranged to communicate in a mobile telecommunications system according to the UMTS standard.

23. A computer program product comprising program code stored on a non-transitory computer readable medium, the program code arranged, in use, to cause the device to perform the method of claim 1.

* * * * *